United States Patent [19]

Bleier

[11] Patent Number: 5,122,901
[45] Date of Patent: Jun. 16, 1992

[54] HOLLOW SURVEYING RETROREFLECTOR ASSEMBLY

[75] Inventor: Zvi Bleier, Wantagh, N.Y.

[73] Assignee: Precision Lapping & Optical Co., Inc., Valley Stream, N.Y.

[21] Appl. No.: 645,985

[22] Filed: Jan. 24, 1991

[51] Int. Cl.⁵ .............................................. G02B 5/122
[52] U.S. Cl. .................................................... 359/529
[58] Field of Search ........................ 359/529, 831, 530

[56] References Cited

U.S. PATENT DOCUMENTS

| 3,574,448 | 4/1971 | Paine ................... | 350/102 |
| 3,663,084 | 5/1972 | Lipkins ................. | 350/102 |
| 3,977,765 | 8/1976 | Lipkins ................. | 359/529 |
| 4,189,209 | 2/1980 | Heasley ................ | 350/103 |
| 4,740,056 | 4/1988 | Bennett ................ | 350/102 |
| 5,024,514 | 6/1991 | Bleier et al. ........... | 350/618 |

Primary Examiner—Frank Gonzalez
Attorney, Agent, or Firm—Gottlieb, Rackman & Reisman

[57] ABSTRACT

A hollow surveying retroreflector assembly is provided which is comprised of a hollow retroreflector received within and adhered to a receptacle. The retroreflector has three plates having optically flat reflecting faces disposed at right angles to each other. The receptacle has a conically configured interior for receiving the retroreflector and for maintaining the perpendicular alignment of the reflecting faces of the plates of the retroreflector. The receptacle having the retroreflector inside is then received within an outer casing to allow for mounting of the hollow surveying retroreflector assembly.

42 Claims, 2 Drawing Sheets

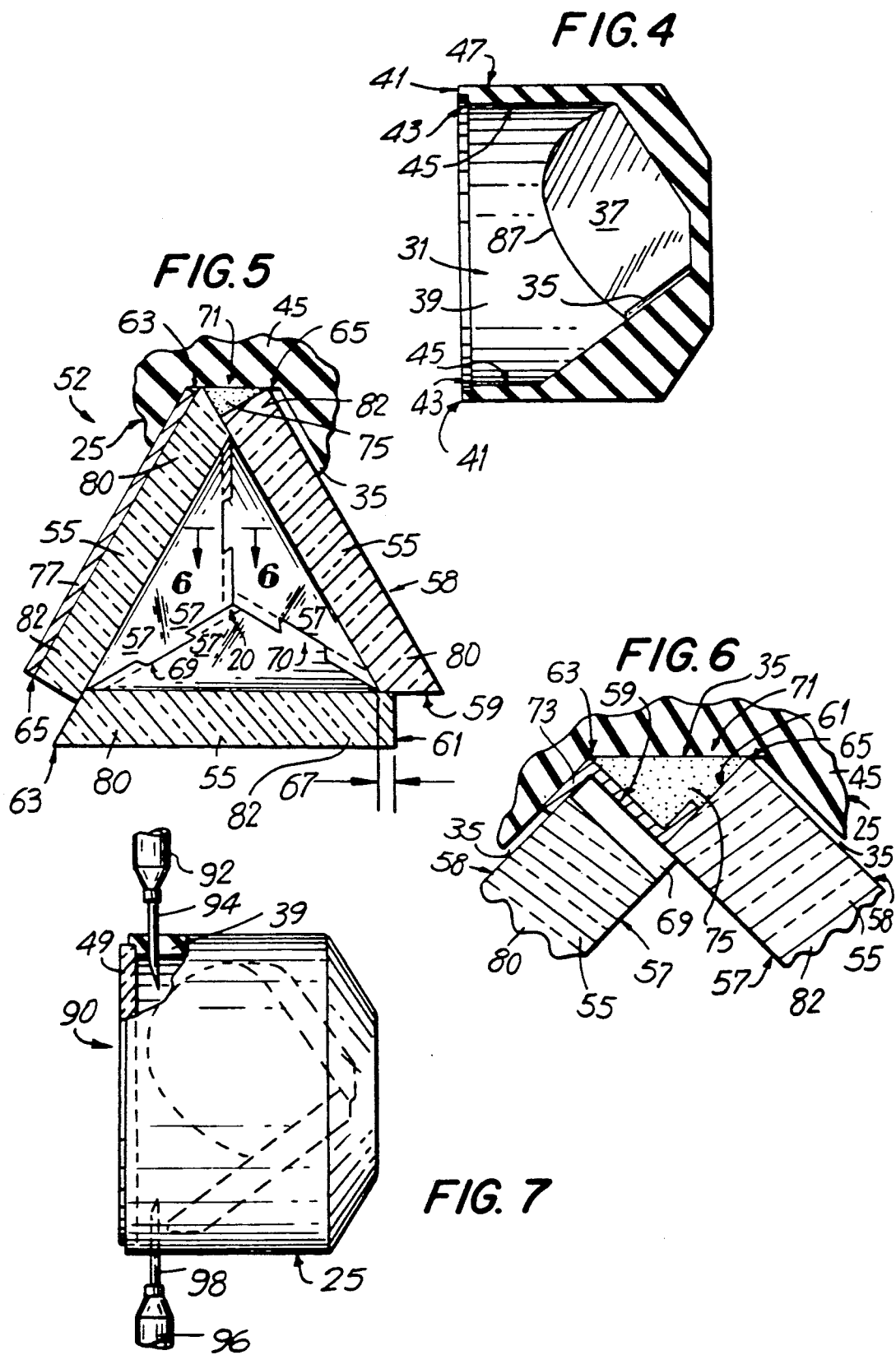

HOLLOW SURVEYING RETROREFLECTOR ASSEMBLY

BACKGROUND OF THE INVENTION

This invention relates to the field of retroreflectors, and more particularly to a hollow retroreflector mounted within a receptacle so that the entire assembly defines a hollow surveying retroreflector assembly.

Hollow retroreflectors are old in the art. Hollow retroreflectors are made of three plates joined together having optically flat reflecting faces disposed at right angles to each other, and meeting at what can be described as a common inside corner of an imaginary cube.

Hollow retroreflectors in general have the essential property of causing incident and the reflected light rays to travel along parallel paths. Accordingly, if the reflecting faces of the plates are not disposed at right angles to each other, the hollow retroreflector will not function properly, as it will not be able to deliver the reflected light ray along a path parallel to the incident light ray.

Specific to this invention, surveying retroreflectors are also old in the art. Since the advent of electronic surveying equipment which uses light rays to perform the measuring and calculating functions required in the field of surveying, surveying retroreflectors have been used to receive an incident light ray and reflect that light ray along a parallel path back to its source. Prior art surveying retroreflectors have primarily consisted of solid retroreflectors, as opposed to hollow retroreflectors.

Solid retroreflectors are formed from a glass cube. Three sides of the glass cube are ground until three mutually perpendicular faces are created which radiate from a single point. The three perpendicular faces are then polished and silvered so as to create three reflecting faces at right angles to each other.

A light ray must be able to propagate through the glass of a solid retroreflector in order to be reflected back along a parallel path to the source of the ray. Accordingly, the prior use of solid retroreflectors in surveying retroreflectors inhibit the wave length properties of light rays used in electronic surveying equipment since some wave lengths of light do not propagate well through glass; i.e., far infrared light.

Due to the limited capabilities of solid retroreflectors in the field of surveying, some uses of hollow surveying retroreflectors have been attempted. Unfortunately, the essential requirement of maintaining the reflecting faces of the hollow retroreflector perfectly perpendicular so as to guarantee parallelism of the incident and reflected light rays has not been satisfactorily achieved by the prior art hollow surveying retroreflectors. Prior art hollow surveying retroreflector assemblies have failed to maintain the mutually perpendicular alignment of their reflecting faces whenever they receive a jolt, i.e., as when they are dropped onto the ground, banged into something or simply mishandled.

Accordingly, it would be desirable to provide a hollow surveying retroreflector assembly that does not lose the perpendicular alignment of its reflecting faces, and therefore maintains the parallelism of the incident and reflected light rays which are vital to the proper functioning of a retroreflector.

SUMMARY OF THE INVENTION

In accordance with the invention, an improved hollow surveying retroreflector assembly is provided. The hollow surveying retroreflector assembly of the invention is comprised of a hollow retroreflector received within and adhered to a receptacle which is itself received into an outer casing.

The hollow retroreflector has three plates having optically flat reflecting faces disposed at right angles to each other and non-reflecting faces opposite to the reflecting faces of the plates.

The receptacle has a substantially conically configured interior having three radially extending grooves and three radially extending flat surfaces into which the hollow retroreflector is received. Each of the flat surfaces is between two of the grooves. The receptacle also has an annular ledge for receiving a glass plate. When the glass plate is adhered to the annular ledge, the receptacle becomes a sealed chamber having the hollow retroreflector therein.

The sealed chamber is then received into the casing and an annular ring secures the sealed chamber within the casing. The casing additionally has a threaded member so that the hollow surveying retroreflector assembly may be mounted onto a support for use in the field.

Accordingly, it is an object of the invention to provide an improved hollow surveying retroreflector assembly.

Still another object of the invention is to provide a hollow surveying retroreflector assembly having a hollow retroreflector received within a receptacle.

Still a further object of the invention is to provide a hollow surveying retroreflector assembly which maintains precise alignment of its perpendicular reflecting faces even if it is roughly handled, dropped onto the ground or banged against something.

Other objects of the invention will in part be obvious and will in part be apparent from the following description.

The invention accordingly comprises an assembly possessing the features, properties and the relation of components which will be exemplified in the products hereinafter described, and the scope of the invention will be indicated in the claims.

BRIEF DESCRIPTION OF THE DRAWINGS

For a fuller understanding of the invention, reference is made to the following description taken in connection with the accompanying drawings, in which;

FIG. 4 is a cross-sectional view taken along line 4—4 of FIG. 3;

FIG. 5 is a partial front elevational view of the hollow surveying retroreflector assembly of FIG. 1;

FIG. 6 is a cross-sectional view taken along line 6—6 of FIG. 5; and

FIG. 7 is a side elevational view of the receptacle of the invention as a sealed chamber.

DETAILED DESCRIPTION OF HE PREFERRED EMBODIMENT

Figure 1:
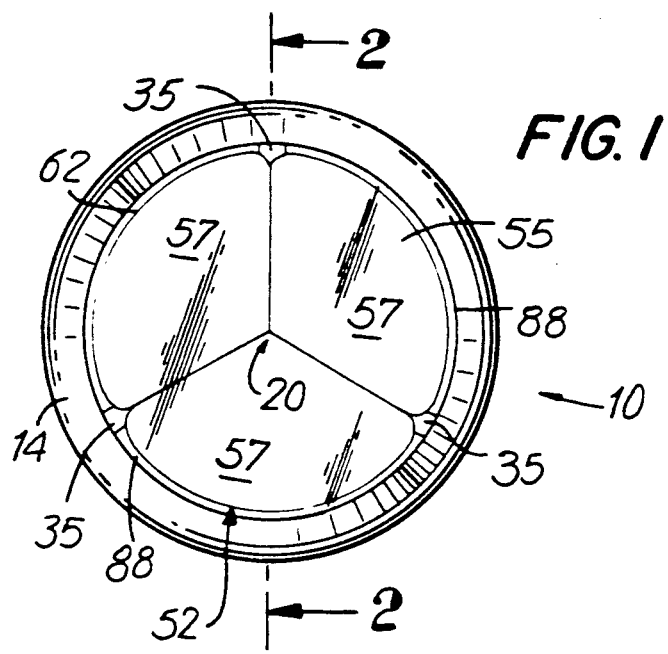
FIG. 1 is a front elevational view of a hollow surveying retroreflector assembly in accordance with the invention.
Figure 2:
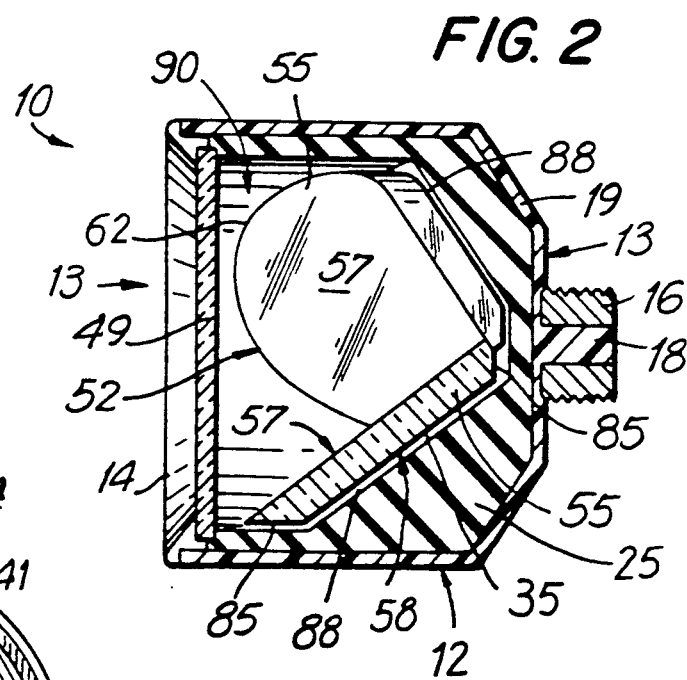
FIG. 2 is a cross-sectional view taken along line 2—2 of FIG. 1.

Referring first to FIGS. 1 and 2, a hollow surveying retroreflector assembly made in accordance with the invention and generally designated at 10 is illustrated. Hollow surveying retroreflector assembly 10 includes a hollow retroreflector 52, a receptacle 25 and a casing 12.

Retroreflector 52, as shown in FIGS. 1, 2 and 5, has three plates 55 which are disposed at right angles to each other. Each of plates 55 has optically flat reflecting faces 57 and non-reflecting faces 58 which are opposite to reflecting faces 57. Retroreflector 52 is designed to receive an incoming (incident) light ray (not shown) and reflect the light ray off of the reflecting faces 57 and out from retroreflector 52 along a path parallel to the incident light ray.

Since this is the primary purpose of a retroreflector, a high degree of precision must be maintained with respect to the perpendicularity of reflecting faces 57. Accordingly, in assembling retroreflector 52, a method must be used which maintains reflecting faces 57 of plates 55 at right angles to each other.

As shown in FIG. 5, each of plates 55 of retroreflector 52 have first sides 59 and second sides 61 which are at right angles to each other. All of plates 55 intersect at a point 20 which can be described as a common inside corner of an imaginary cube. Each of plates 55 also have a curved side 62 which connect first side 59 with second side 61, as shown in FIGS. 1 and 2.

As seen in FIG. 2, non-reflecting face 58 of plate 55 is substantially the same size as reflecting face 57. However, at curved end 62 of each of plates 55 and below point 20 at the intersection of plate 55, non-reflecting face 58 of each of plates 55 is chamfered to angularly intersect reflecting faces 57. Chamfers 85 of non-reflecting faces 58 enable plates 55 to fit snugly within receptacle 25, as will be discussed more completely below.

Turning again to FIG. 5, when retroreflector 52 is assembled, each of first sides 59 of plates 55 are partially abutted against and joined to reflecting surface 57 of a plate 55 which is adjacent to it. Accordingly, each of plates 55 are simultaneously an abutting plate 80 at first side 59, and an adjacent plate 82 at second side 61. First sides 59 of abutting plates 80 abut reflecting faces 57 of adjacent plates 82 at second sides 61 of adjacent plates 82.

As is also shown in FIG. 5, each of second sides 61 of adjacent plates 82 is a narrow distance 67 from each of reflecting faces 57 of abutting plates 80. Narrow distance 67 is a smaller distance than the width of first sides 59 of plates 55.

Plates 55 are connected in the alternately overlapping manner shown in FIG. 5, and described above, in order to maintain reflecting faces 57 at right angles to each other. In this respect, each of first sides 59 of plates 55 is given a thin coat of cementing material (not shown) to adhere abutting plate 80 to reflecting face 57 of adjacent plate 82. The cementing material is applied along narrow distance 67 of first side 59.

Continuing with FIG. 5, first sides 59 of each of plates 55 have a notch 69 which extends along a portion of first side 59 from reflecting face 57 to non-reflecting face 58. Notch 69 allows for a further reduced surface area of first sides 59 for abutting against reflecting faces 57 of adjacent plates 82. Notch 69 further decreases the area of contact between narrow distance 67 of first side 59 and reflecting face 57 because notch 69 creates a gap 70 between first side 59 and reflecting face 57.

Such an application of cement to a narrow area of first sides 59 of plates 55 results in an excellent bond between abutting plates 80 and adjacent plates 82. The bond produces only minimal stresses along reflecting faces 57 of plates 55 during the curing of the cement. Since the stress on reflecting faces 57 is reduced during curing of the cement, reflecting faces 57 are maintained at right angels to each other so that retroreflector 52 will maintain incident and reflected light rays parallel to each other.

Additionally, due to notches 69 in first sides 59 of plates 55 which create bonds of limited length between first sides 59 and reflecting faces 57, distortion of reflecting faces 57 due to stresses induced by changes in temperature are also minimized. Accordingly, notches 69 allow retroreflector 52 to be thermally stable with respect to the perpendicularity of reflecting faces 57.

Turning now to FIG. 6, after retroreflector 52 has been assembled as described above, an adhesive strip 73 is applied along first sides 59 over the portion of notch 69 which will be located within cavity 71 (discussed below). Adhesive strip 73 is used to seal off notch 69 so that gap 70 created by notch 69 between first side 59 and reflecting surface 57 is sealed within cavity 71. Accordingly, adhesive strip 73 is applied from non-reflecting face 58 of abutting plate 80, across notch 69 along first side 59 to second side 61 of adjacent plate 82.

Figure 3:
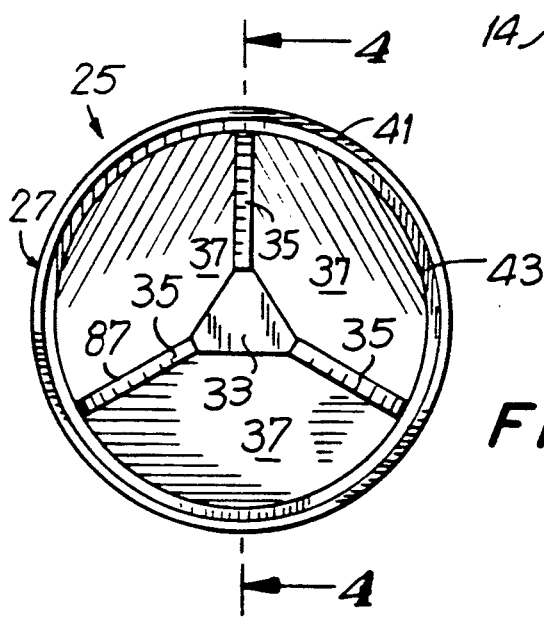
FIG. 3 is a front elevational view of a receptacle of the hollow surveying retroreflector assembly of FIG. 1.

Turning now to FIGS. 3 and 4, a receptacle generally indicated at 25 is shown. Receptacle 25 is comprised of a cup shaped member 27 having a bottom 29. Cup shaped member 27 has an annular rim 41 located away from bottom 29. Annular rim 41 has annular inner ledge 43. Inner ledge 43 is designed to receive a cover 49 (see FIG. 2). Cover 49 is preferably a glass plate which extends above annular rim 41, as shown in FIG. 2.

Continuing with FIGS. 3 and 4, receptacle 25 also has a substantially conically configured interior 31. Conical interior 31 has an apex region 33 which is located along bottom 29 of cup shaped member 27. Apex region 33 of receptacle 25 receives chamfers 85 of non-reflecting faces 58 located below point 20 of the intersection of plates 55 (see FIGS. 1, 2 and 5).

Conical interior 31 also has three radially extending grooves 35 and three radially extending flat surfaces 37, shown in FIG. 3. Grooves 35 and flat surfaces 37 radiate from apex region 33. Each of flat surfaces 37 is located between two of grooves 35. Accordingly, conical interior 31 has a surface for receiving retroreflector 52 which alternates between grooves 35 and flat surfaces 37. Each of flat surfaces 37 has a shape which is similar to non-reflecting face 58 of plates 55 for receiving retroreflector 52.

Continuing with FIG. 5, each of non-reflecting faces 58 of plates 55 have spacers 77 attached thereto before retroreflector 52 is received within receptacle 25. Spacers 77 are removable once retroreflector 52 has been adhesively secured within receptacle 25, as will be discussed below.

Turning now to FIGS. 2, 5 and 6, retroreflector 52 is inserted into receptacle 25 and received into conical interior 31. Spacers 77, which are removingly attached to non-reflecting faces 58 of plates 55, touch flat surfaces 37 of receptacle 25 when retroreflector 52 is inserted into receptacle 25.

Additionally, as shown in FIGS. 5 and 6, each of first sides 59 of plates 55 have a first edge 63, and each of second sides 61 of plates 55 have a second edge 65. Each of first edges 63 and second edges 65 touch a corresponding groove 35 of conical interior 31 of receptacle 25 when retroreflector 52 is received within receptacle 25.

Continuing with FIGS. 5 and 6, cavities 71 are defined by each of first sides 59, second sides 61 and corresponding groove 35. Each of cavities 71 are then filled with an adhesive material 75 which when dry will adhere first sides 59 and second sides 61 of plates 55 to grooves 35 of receptacle 25. Accordingly, retroreflector 52 is adhered to receptacle 25 once adhesive material 75 has cured within cavities 71.

In order to prevent deflection of reflecting faces 57 of plates 55 from their mutually perpendicular alignment as adhesive material 75 cures and therefore shrinks within cavities 71, as has been previously discussed, spacers 77 are attached to non-reflecting faces 58 of plates 55 before retroreflector 52 is inserted into receptacle 25. Once adhesive material 75 has cured, and retroreflector 52 is adhered to receptacle 25, spacers 77 are removed from between non-reflecting faces 58 and flat surfaces 37 of receptacle 25.

As shown in FIGS. 1 and 2, when spacers 77 are removed, a space 88 is created between non-reflecting faces 58 of plates 55 and flat surfaces 37 of receptacle 25. Accordingly, retroreflector 52 only touches receptacle 25 along grooves 35 of receptacle 25. The insertion and subsequent removal of spacers 77 ensures that chamfers 85 of non-reflecting faces 58 do not touch receptacle 25 either at curved sides 62 of plates 55 or at apex region 33 of cup shaped member 27.

Spaces 88 act as air cushions between non-reflecting faces 58 and flat surfaces 37. Accordingly, pressure on non-reflecting faces 58 from flat surfaces 37 is prevented by spaces 88. Thus, a stress free assembly is established which maintains the accuracy requirement needed in retroreflectors of LAMDA/10 peak to valley wave front error.

Accordingly, if hollow surveying retroreflector assembly 10 is roughly handled, dropped onto concrete or banged against something spaces 88 only allow non-reflecting faces 58 to be pressured by flat surfaces 37 for a brief period during the impact. Immediately after impact, spaces 88 re-establish the stress free relationship between non-reflecting faces 58 and flat surfaces 37. Therefore, the accuracy requirement of LAMDA/10 wave front error is maintained by spaces 88.

As an additional matter, receptacle 25 is preferably made of rubber. Accordingly, the rubber construction of receptacle 25 adds an additional shock absorbing quality to the construction of hollow surveying retroreflector assembly 10. Therefore the combined effect of having a receptacle made of rubber and spaces 88 between plates 55 and receptacle 25 allow for hollow surveying retroreflector assembly 10 to be significantly jostled and bounced before any possible misalignment of reflecting faces 57 may occur. Accordingly, purchasing hollow surveying retroreflector assembly 10 is economical since hollow surveying retroreflector assembly 10 will not have to be discarded every time it is accidentally dropped or hit against a wall or a tree while it is being used.

Turning to FIGS. 2 and 3, and as has been previously discussed, receptacle 25 receives a cover 49 within annular inner ledge 43 of annular rim 41. Cover 49 is adhered to inner ledge 43 so as to seal retroreflector 52 within receptacle 25 thereby creating a sealed chamber 90. When cover 49 has been secured to receptacle 25, condensatable gas (not shown) is trapped within sealed chamber 90. In order to prevent condensation of the condensatable gas within sealed chamber 90, the condensatable gas is removed from within sealed chamber 90.

More particularly, as has been shown in FIG. 7, a first needle 94 of a first syringe 92 is inserted through receptacle 25. First syringe 92 contains a non-condensatable gas (not shown), which is preferably nitrogen gas. Additionally, a second needle 98 of a second syringe 96 is inserted through another portion of receptacle 25 and into sealed chamber 90. Second syringe 96 is not filled with any gas when second needle 98 is inserted into sealed chamber 90. The non-condensatable gas within first syringe 92 is injected through needle 94 into sealed chamber 90. Simultaneously with the injection of the non-condensatable gas into sealed chamber 90, the condensatable gas located within sealed chamber 90 is withdrawn from sealed chamber 90 through second needle 98 into second syringe 96 by the drawing action of second syringe 96. Accordingly, the condensatable gas located within receptacle 25 is removed from sealed chamber 90 and is replaced by the non-condensatable gas previously located within first syringe 92.

Continuing with FIGS. 1 and 2, after the non-condensatable gas is injected into sealed chamber 90, receptacle 25 is received within a casing assembly 12. Casing assembly 12 has a casing 13 for receiving receptacle 25, a threaded member 16 for mounting casing 13 onto a support and an annular closing ring 14 for maintaining receptacle 25 in casing 13.

Casing 13 has a base 19 from which threaded member 16 extends. Threaded member 16 is attached around a protruding member 18 extending from base 19 of casing 13. Threaded member 16 provides a method of mounting hollow surveying retroreflector assembly 10 to a support (not shown) such as a pole or other surveying equipment.

Continuing with FIGS. 1, and 2, in order to secure receptacle 25 within casing 13, casing assembly 12 further includes annular closing ring 14. Annular ring 14 is adhered to casing 13 and secures retroreflector 52 within receptacle 25 by pressing against cover 49, as shown in FIG. 2.

Casing 13 and annular ring 14 of casing assembly 12 are preferably made of plastic so as to reduce the overall weight of surveying retroreflector assembly 10.

It will thus be seen that the objects set forth above, among those made apparent from the preceding description, are efficiently attained and, since certain changes may be made in the above constructions without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A surveying retroreflector assembly, comprising:
    a retroreflector comprising three plates having optically flat reflecting faces disposed at right angles to each other, wherein each of said plates has first and second sides at right angles to each other, said first side of each of said plates abutting and being joined to said reflecting face of said plate adjacent to said abutting plate; and a receptacle adapted for placing said retroreflector therein having a substantially conically configured interior, said conical interior having three radially extending grooves, each of said grooves for receiving said first side of one of said abutting plates and said second side of said adjacent plate for maintaining said reflecting faces of said plates at right angles to each other.

2. A surveying retroreflector assembly as recited in claim 1, wherein said conical interior of said receptacle further comprises three radially extending substantially flat surfaces, each of said flat surfaces located between two of said grooves wherein each of said flat surfaces is sized substantially similarly to each of said plates and wherein each of said plates is disposed over said corresponding flat surface for defining a space between each of said plates and said corresponding flat surface when said retroreflector is received in said receptacle.

3. A surveying retroreflector assembly as recited in claim 2, wherein each of said grooves receives both said first side of said abutting plate and said second side of said adjacent plate.

4. A surveying retroreflector assembly as recited in claim 3, wherein said plates further have non-reflecting faces opposite to said reflecting faces.

5. A surveying retroreflector assembly as recited in claim 4, wherein each of said reflecting faces of said adjacent plates ends at said second side of said adjacent plate spaced from said reflecting face of said abutting plate by a relatively narrow distance compared with the width of said first side of said abutting plate.

6. A surveying retroreflector assembly as recited in claim 5, wherein each of said first sides of said abutting plates comprise a first edge located away from said abutting plate reflecting face and each of said second sides of said adjacent plates comprise a second edge located away from said adjacent plate reflecting face.

7. A surveying retroreflector assembly as recited in claim 6, wherein said first edge of each of said abutting plates and said second edge of each of said adjacent plates are substantially in contact with each of said grooves of said receptacle.

8. A surveying retroreflector assembly as recited in claim 7, wherein each of said abutting plates comprise a notch extending along a portion of said first side from said reflecting face to said non-reflecting face and defining a gap between said abutting plate and said reflecting face of said adjacent plate.

9. A surveying retroreflector assembly as recited in claim 8, wherein each of said first sides of said abutting plates, each of said second sides of said adjacent plates and said corresponding groove of said receptacle define a cavity.

10. A surveying retroreflector assembly as recited in claim 9, wherein said notch of said abutting plate defines a space, said space communicating with said cavity.

11. A surveying retroreflector assembly as recited in claim 10, further comprising an adhesive strip disposed along said first side of said abutting plate for preventing communication between said cavity and said space defined by said notch.

12. A surveying retroreflector assembly as recited in claim 11, wherein said adhesive strip extends from said non-reflecting face of said abutting plate to said second side of said adjacent plate.

13. A surveying retroreflector assembly as recited in claim 12, wherein said first side of said abutting plate and said second side of said adjacent plate are secured to said corresponding groove of said receptacle by an adhesive material received into said cavity.

14. A surveying retroreflector assembly as recited in claim 1, wherein said receptacle is substantially cup shaped having a bottom and an annular rim located away from said bottom.

15. A surveying retroreflector assembly as recited in claim 14, wherein said receptacle further comprises an annular inner ledge located adjacent said annular rim.

16. A surveying retroreflector assembly as recited in claim 15, wherein said inner ledge is adapted to receive a cover.

17. A surveying retroreflector assembly as recited in claim 16, wherein said cover is a glass plate.

18. A surveying retroreflector assembly as recited in claim 16, wherein said receptacle and said cover define a sealed chamber when said cover is secured to said inner ledge.

19. A surveying retroreflector assembly as recited in claim 18, wherein said sealed chamber contains a substantially non-condensatable gas.

20. A surveying retroreflector assembly as recited in claim 19, wherein said non-condensatable gas is nitrogen gas.

21. A surveying retroreflector assembly as recited in claim 1, further comprising a casing assembly for receiving said receptacle.

22. A surveying retroreflector assembly as recited in claim 21, wherein said casing assembly comprises a casing, means for mounting said casing on a support and means for maintaining said receptacle in said casing.

23. A surveying retroreflector assembly as recited in claim 22, wherein said casing comprises a base, and said mounting means extends from said base of said casing.

24. A surveying retroreflector assembly as recited in claim 23, wherein said mounting means is a threaded member for screwingly attaching said casing to said support.

25. A surveying retroreflector assembly as recited in claim 23, wherein said maintaining means comprises an annular closing ring.

26. A surveying retroreflector assembly as recited in claim 25, wherein said closing ring is adhered to an annular lip of said casing located away from said base to fixedly maintain said receptacle received within said casing.

27. For a retroreflector having three plates having optically flat reflecting faces disposed at right angles to each other, a receptacle adapted to receive said retroreflector, said receptacle comprising a member having a substantially conically configured interior, said conical interior having three radially extending grooves and three radially extending substantially flat surfaces wherein each of said flat surfaces is located between two of said grooves for maintaining said reflecting faces of said plates right angles to each other.

28. A receptacle as recited in claim 27, wherein said member is substantially cup shaped having a bottom and an annular rim located away from said bottom.

29. A receptacle as recited in claim 28, wherein said cup shaped member of said receptacle further comprises an annular inner ledge located adjacent said annular rim.

30. A receptacle as recited in claim 29, wherein said inner ledge is adapted to receive a cover.

31. A receptacle as recited in claim 30, wherein said cover is a glass plate.

32. A method of assembling a retroreflector within a receptacle, comprising the steps of:
 assembling a retroreflector by disposing three plates having optically flat reflecting faces at right angles to each other, said plates further having first and second perpendicular sides;
 placing said retroreflector in a receptacle by:
 a) receiving said first side of one of said plates and said second side of an adjacent plate in a corresponding radially extending groove of said receptacle; and
 b) disposing each of said plates over a corresponding radially extending substantially flat surface of said receptacle located between two of said grooves in order to define a space between each of said plates and said corresponding flat surface.

33. A method of assembling a retroreflector within a receptacle as recited in claim 32, further comprising the step of removably attaching a spacer to each of said plates prior to said placing step for maintaining separation of said plate from said flat surface.

34. A method of assembling a retroreflector within a receptacle as recited in claim 33, further comprising the steps of:
 filling a cavity defined by said first side of one of said plates, said second side of said adjacent plate and said corresponding groove of said receptacle with an adhesive material; and
 allowing said adhesive material to cure so that said retroreflector is adhered within said receptacle once said adhesive material has cured.

35. A method of assembling a retroreflector within a receptacle as recited in claim 34, further comprising the step of removing said spacers from between said plates and said corresponding flat surfaces of said receptacle.

36. A method of assembling a retroreflector within a receptacle as recited in claim 34, wherein said assembling step further comprises defining a notch on each of said first sides of said plates, wherein said notch defines a space which communicates with said cavity.

37. A method of assembling a retroreflector within a receptacle as recited in claim 36, further comprising the step of attaching an adhesive strip along said first side of each of said plates for preventing communication between said cavity and said space defined by said notch.

38. A method of assembling a retroreflector within a receptacle as recited in claim 32, further comprising the step of sealing said receptacle with a cover.

39. A method of assembling a retroreflector within a receptacle as recited in claim 38, further comprising the steps of simultaneously:
 injecting a substantially non-condensatable gas into said sealed receptacle; and
 withdrawing a substantially condensatable gas from within said sealed receptacle so that said condensatable gas is replaced within said sealed receptacle by said non-condensatable gas.

40. A method of assembling a retroreflector within a receptacle as recited in claim 39, wherein said injecting and withdrawing steps comprise inserting first and second needles of first and second syringes into said receptacle wherein said first syringe has said non-condensatable gas therein for injection into said receptacle and said second syringe withdraws said condensatable gas from said receptacle.

41. A method of assembling a retroreflector within a receptacle as recited in claim 40, wherein said non-condensatable gas is nitrogen gas.

42. A method of assembling a retroreflector within a receptacle as recited in claim 40, wherein said condensatable gas is oxygen gas.

* * * * *